US011776403B2

(12) United States Patent
Xiao

(10) Patent No.: US 11,776,403 B2
(45) Date of Patent: Oct. 3, 2023

(54) AUTONOMOUS DRIVING VEHICLE, INTELLIGENT PARKING METHOD AND INTELLIGENT CONTROL DEVICE FOR AUTONOMOUS DRIVING VEHICLE

(71) Applicant: SHENZHEN ANTU AUTONOMOUS DRIVING TECHNOLOGIES LTD., Shenzhen (CN)

(72) Inventor: Jianxiong Xiao, Shenzhen (CN)

(73) Assignee: SHENZHEN ANTU AUTONOMOUS DRIVING TECHNOLOGIES LTD., Shenzhen (CN)

( * ) Notice: Subject to any disclaimer, the term of this patent is extended or adjusted under 35 U.S.C. 154(b) by 141 days.

(21) Appl. No.: 17/341,425

(22) Filed: Jun. 8, 2021

(65) Prior Publication Data
US 2021/0383699 A1 Dec. 9, 2021

(30) Foreign Application Priority Data
Jun. 8, 2020 (CN) .......................... 202010515190.6

(51) Int. Cl.
*B60W 30/06* (2006.01)
*G06Q 10/047* (2023.01)
*G08G 1/14* (2006.01)

(52) U.S. Cl.
CPC ............ *G08G 1/144* (2013.01); *B60W 30/06* (2013.01); *G06Q 10/047* (2013.01); *G08G 1/146* (2013.01)

(58) Field of Classification Search
None
See application file for complete search history.

(56) References Cited

U.S. PATENT DOCUMENTS

| 10,789,844 | B1 * | 9/2020 | Whikehart | ......... G01C 21/3685 |
| 2009/0187340 | A1 * | 7/2009 | Vavrus | ................... G08G 1/146 |
| | | | | 701/414 |
| 2020/0160712 | A1 * | 5/2020 | Beaurepaire | ........... G08G 1/148 |
| 2020/0369293 | A1 * | 11/2020 | Jeon | ...................... B60W 50/14 |

FOREIGN PATENT DOCUMENTS

| CN | 108766011 | 11/2018 |
| CN | 110576852 | 12/2019 |

\* cited by examiner

*Primary Examiner* — John F Mortell

(57) ABSTRACT

An intelligent parking method of an autonomous driving vehicle is provided. The intelligent parking method includes steps of: recommending a first parking location according to an acquired target location; constructing an observation area according to the first parking location; obtaining environmental data of the observation area when the autonomous driving vehicle reaches the observation area; determining whether the first parking location is available or not according to the environmental data of the observation area; driving to the first parking location to park when the first parking location is available; or acquiring a second parking location according to a predetermined evaluation rule when the first parking location is unavailable, and recommending the one or more second parking locations to the user for selection; and driving to the second parking location selected by the user to park.

17 Claims, 6 Drawing Sheets

AUTONOMOUS DRIVING VEHICLE, INTELLIGENT PARKING METHOD AND INTELLIGENT CONTROL DEVICE FOR AUTONOMOUS DRIVING VEHICLE

CROSS-REFERENCE TO RELATED APPLICATIONS

This non-provisional patent application claims priority under 35 U.S.C. § 119 from Chinese Patent Application No. 202010515190.6 filed on Jun. 8, 2020, the entire content of which is incorporated herein by reference.

TECHNICAL FIELD

The disclosure relates to the technical field of autonomous driving, particularly relates to an autonomous driving vehicle, and an intelligent parking method and a control device for the autonomous driving vehicle.

BACKGROUND

Autonomous driving vehicles (autonomous taxis, autonomous delivery vehicles, and other autonomous driving vehicles) need to stop to provide services for passengers and cargo. Typically, autonomous driving vehicles drives to a predetermined location, such as a bus station, which enables the passengers and cargo to get on and off. The typical autonomous driving vehicles system cannot provide users with more convenient services, for example, the autonomous taxis is downgraded to the autonomous bus.

The user's pick-up and drop-off location or the delivery location can be any designated locations, such as a roadside, a gate, etc., which can not a unchangeable parking location predetermined in the autonomous driving vehicle. Therefore, the typical autonomous driving vehicle cannot meet the user's demand for parking at any designated locations.

SUMMARY

In a first aspect, an intelligent control device for an automatic driving vehicle, the intelligent control device includes steps of: An intelligent parking method of an autonomous driving vehicle, the intelligent parking method includes steps of: recommending a first parking location according to an acquired target location; constructing an observation area according to the first parking location; obtaining environmental data of the observation area when the autonomous driving vehicle reaches the observation area; determining whether the first parking location is available or not according to the environmental data of the observation area; driving to the first parking location to park when the first parking location is available; or acquiring a second parking location according to a predetermined evaluation rule when the first parking location is unavailable, and recommending the one or more second parking locations to the user for selection; and driving to the second parking location selected by the user to park.

In a second aspect, an intelligent control device for an automatic driving vehicle, the intelligent control device includes a memory and one or more processor, the memory is configured to store program instructions; the one or more processor are configured to execute the program instructions to enable the intelligent control device to implement an intelligent parking method, the intelligent parking method includes steps of: recommending a first parking location according to an acquired target location; constructing an observation area according to the first parking location; obtaining environmental data of the observation area when the autonomous driving vehicle reaches the observation area; determining whether the first parking location is available or not according to the environmental data of the observation area; driving to the first parking location to park when the first parking location is available; or acquiring a second parking location according to a predetermined evaluation rule when the first parking location is unavailable, and recommending the one or more second parking locations to the user for selection; and driving to the second parking location selected by the user to park.

In a third aspect, an autonomous driving vehicle, the autonomous driving vehicle includes a main body, and an intelligent control device installed in the main body. the intelligent control device includes a memory and one or more processor, the memory is configured to store program instructions; the one or more processor are configured to execute the program instructions to enable the intelligent control device to implement an intelligent parking method, the intelligent parking method includes steps of: recommending a first parking location according to an acquired target location; constructing an observation area according to the first parking location; obtaining environmental data of the observation area when the autonomous driving vehicle reaches the observation area; determining whether the first parking location is available or not according to the environmental data of the observation area; driving to the first parking location to park when the first parking location is available; or acquiring a second parking location according to a predetermined evaluation rule when the first parking location is unavailable, and recommending the one or more second parking locations to the user for selection; and driving to the second parking location selected by the user to park.

As described above, the autonomous driving vehicle is capable of parking in a target location specified by a use and it is more flexible for user to get on and off by taking the autonomous driving vehicle.

BRIEF DESCRIPTION OF THE DRAWINGS

In order to illustrate the technical solution in the embodiments of the disclosure or the prior art more clearly, a brief description of drawings required in the embodiments or the prior art is given below. Obviously, the drawings described below are only some of the embodiments of the disclosure. For ordinary technicians in this field, other drawings can be obtained according to the structures shown in these drawings without any creative effort.

DETAILED DESCRIPTION OF THE EMBODIMENTS

In order to make the purpose, technical solution and advantages of the disclosure more clearly, the disclosure is further described in detail in combination with the drawings and embodiments. It is understood that the specific embodiments described herein are used only to explain the disclosure and are not used to define it. On the basis of the embodiments in the disclosure, all other embodiments obtained by ordinary technicians in this field without any creative effort are covered by the protection of the disclosure.

The terms "first", "second", "third", "fourth", if any, in the specification, claims and drawings of this application are used to distinguish similar objects and need not be used to describe any particular order or sequence of priorities. It should be understood the data used here are interchangeable where appropriate, in other words, the embodiments described can be implemented in order other than what is illustrated or described here. In addition, the terms "include" and "have" and any variation of them, can encompass other things. For example, processes, methods, systems, products, or equipment that comprise a series of steps or units need not be limited to those clearly listed, but may include other steps or units that are not clearly listed or are inherent to these processes, methods, systems, products, or equipment.

It is to be noted that the references to "first", "second", etc. in the disclosure are for descriptive purpose only and neither be construed or implied the relative importance nor indicated as implying the number of technical features. Thus, feature defined as "first" or "second" can explicitly or implicitly include one or more such features. In addition, technical solutions between embodiments may be integrated, but only on the basis that they can be implemented by ordinary technicians in this field. When the combination of technical solutions is contradictory or impossible to be realized, such combination of technical solutions shall be deemed to be non-existent and not within the scope of protection required by the disclosure.

Figure 1:
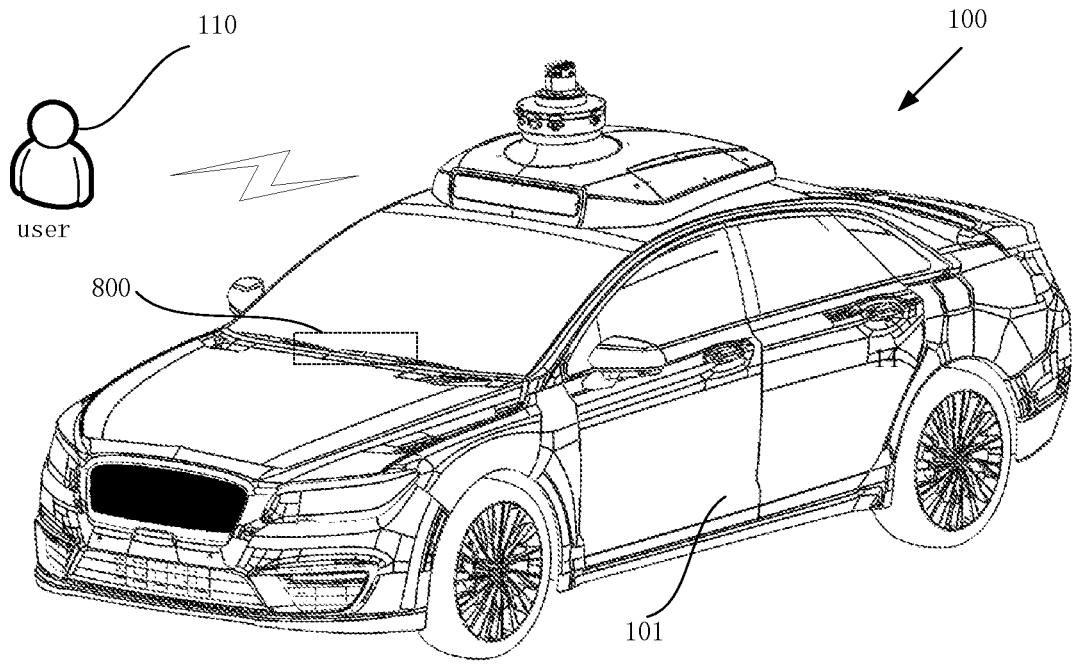
FIG. 1 is a schematic diagram of an autonomous driving vehicle in accordance with an embodiment.

Referring to FIG. 1, an autonomous driving vehicle 100 is illustrated. The autonomous driving vehicle 100 includes software systems such as a perception system and a cooperative vehicle infrastructure system. The perception system performs a series of operations on data detected via a plurality of sensors and information of a high-precision map to perceive surrounding environment of the autonomous driving vehicle 100. And the perception system is capable of providing lower computing modules with rich information which include locations, shapes categories, and speed information of obstacles as well as semantic information of some special scenes, such as construction areas, traffic lights, and traffic signs. The cooperative vehicle infrastructure system adopts advanced wireless communication and new generation Internet technologies to implement comprehensive real-time interaction among vehicles and vehicles, or vehicles and roads, and to carry out active vehicle safety control and road collaborative management based on the collection and fusion of full time-space dynamic traffic information. As a result, it enables people, vehicles, and roads to cooperative effectively, and ensures traffic safety and improves traffic efficiency that a safe, efficient and environmentally friendly road traffic system is formed. In detail, the autonomous driving vehicle 100 is a vehicle that automatically transports a user from one location to another location under unmanned driving conditions. The autonomous driving vehicle 100 may also be any other transportation equipment such as a motorcycle, a truck, a sports utility vehicle (SUV), a recreational vehicle (RV), a ship, an aircraft, etc. In an exemplary embodiment, the autonomous driving vehicle 100 is called a level four autonomous driving system or a level five autonomous driving system. The level four system refers to a "highly automated" autonomous driving system. The autonomous driving vehicle 100 with the level four autonomous driving system can autonomously make decisions generally without a human driver. For example, the autonomous driving vehicle 100 with the level four autonomous driving system has corresponding functions for various actual scenarios, such as autonomous retrieval and return, autonomous cruise, autonomous obstacle avoidance and so on based on road information data updated in real time. The level five system refers to the "fully automated" autonomous driving system. The autonomous driving vehicle of the level five system can autonomously make decisions without the human driver at all base on road information data updated in real time, and the autonomous driving vehicle of the level five system can drive autonomously in any weather and any area, and can respond to the environment and climate. And the autonomous driving vehicle of the level five system can deal with various actual road conditions caused by changes in the environment, climate and geographic location. In this embodiment, the autonomous driving vehicle 100 includes a main body 101, and an intelligent control device 800 installed in the main body 101 and executing an intelligent parking program to enable the autonomous driving vehicle 100 to park in a location specified by a user. It is understood that it is more flexible for user to get on and off by taking the autonomous driving vehicle 100.

The user 110 interacts with the autonomous driving vehicle 100 through a user terminal (not shown). The user 110 refers to a passenger who rides in autonomous driving vehicle 100 or a cargo owner who needs autonomous driving vehicle 100 to transport goods. The user terminal can be a terminal with communication function such as a mobile phone, a notebook computer, a tablet computer, etc.

Figure 2:
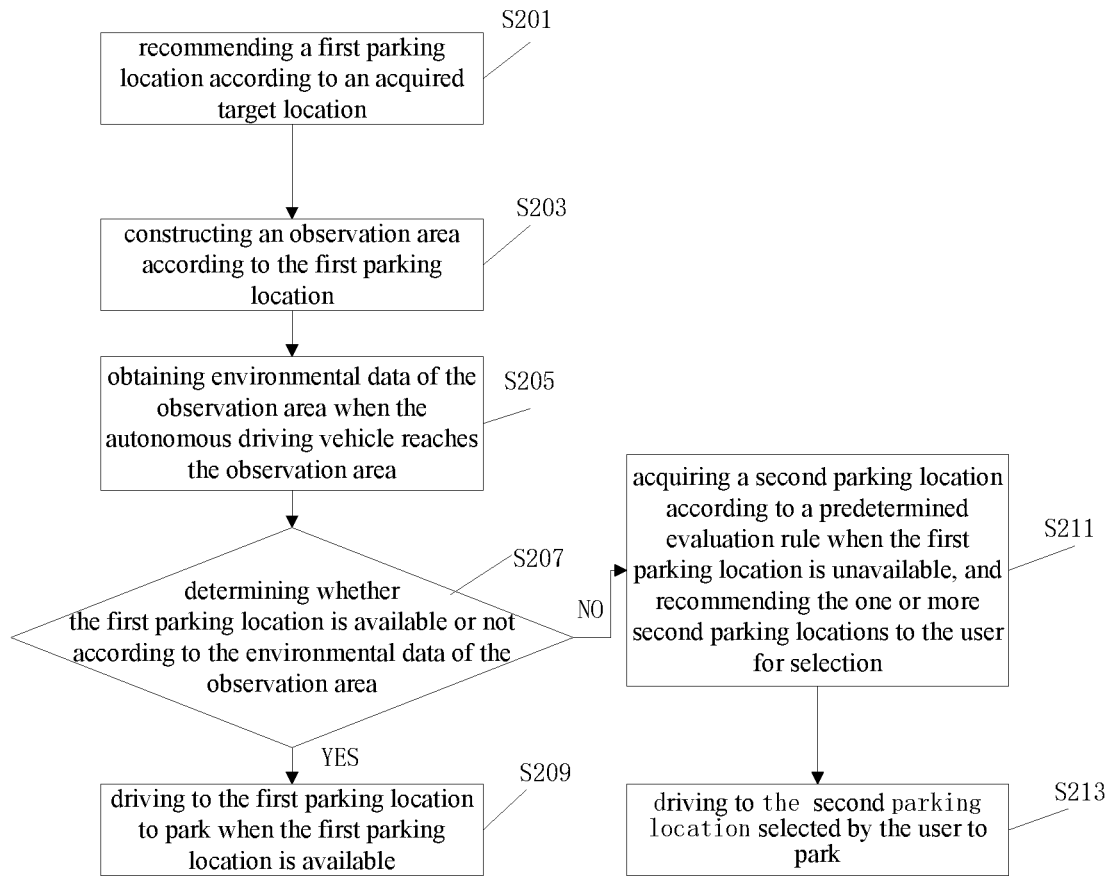
FIG. 2 is a schematic flowchart of a method for intelligent parking of an autonomous vehicle in accordance with an embodiment.

Referring to FIG. 2, a schematic flowchart of a method for intelligent parking for the autonomous driving vehicle in accordance with an embodiment is illustrated. The intelligent parking method includes the following steps.

In step S201, a first parking location is obtained according to an acquired target location. In detail, the target location may be sent to the autonomous driving vehicle 100 through the user terminal. For example, the user 110 may input the target location at where the autonomous driving vehicle 100 will arrived into the user terminal device via a input device, and the user terminal device send the target location to the autonomous driving vehicle 100. The autonomous driving vehicle 100 acquired the target location sent by the user terminal, and can match a parking scene around the target location according to a high-precision map stored in the autonomous driving vehicle 100. The parking scene may be a roadside scene, a parking scene, and a business district scene and so on. The first parking location is obtained according to parking recommendation algorithm corresponding to the parking scene, and the first parking location is pushed to the user terminal.

Figure 7A:
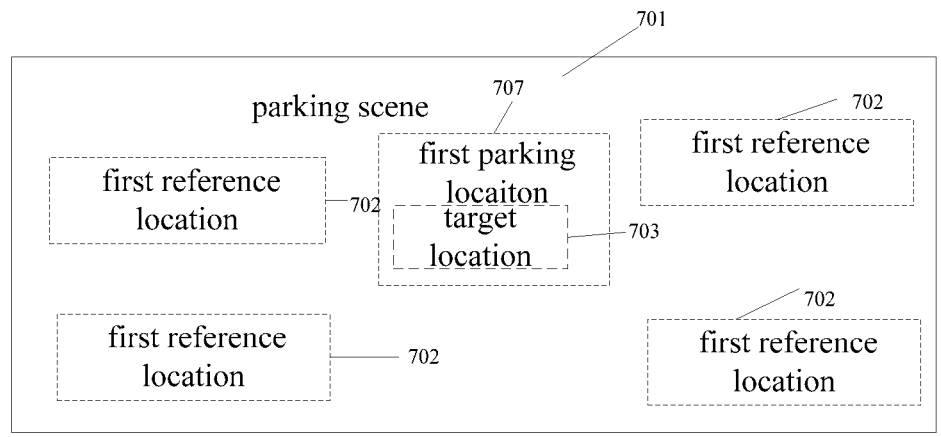
FIG. 7A is a schematic diagram of a parking lot scene in accordance with an embodiment.

Referring to FIG. 7A, the autonomous driving vehicle 100 can recommend the first parking location 707 based on the current parking scene 701 of the target location 703. In detail, step S201 further includes steps of: matching the parking scene 701 of the target location 703 according to the received target location 703; and recommending the first parking location 707 according to the parking scene 701.

Matching the parking scene 701 with the target location 703 according to the acquired target location 703 further includes the following steps: the autonomous driving vehicle 100 searches surrounding environment data of the target location 703 in the high-precision map according to the target location 703 selected by the user 110; and identifies the parking scene 701 according to the surrounding environment data. For example, the user specifies the target location 703 as a certain shopping mall on a certain street, and confirms the parking scene 701 at the target location to be a business district scene by querying the high-precision map.

Recommending the first parking location 707 according to the parking scene 701 further includes the following steps. First, a plurality of parking location algorithms is provided. The plurality of the parking location algorithms are arranged in a priority order of the parking scene. The priority levels of parking location algorithms are difference when the parking scenes are difference. Second, a first parking location 707 is recommended by a parking location algorithm of a highest priority level is selected according to the parking scene. In detail, there are a plurality of first reference locations 702 recommended by the selected parking location algorithm, then the first reference location 702 with the smallest distance to the target location 703 is calculated according to the parking scene 701, and the first reference location 702 with the smallest distance to the target location 703 is determined as the first parking location 707.

The parking location algorithms include but are not limited to the following algorithms: (1) Using high-precision map markings to indicate areas which can be parked in legally and which are illegal to park in, and calculating the first parking location in the safe and legal parking area; (2) Calculating areas (which section of road, which piece of land) which are safe and legal to park in according to various map semantics and geometric shape information about limit speed information and calculating the first parking location in the safe and legal parking area; (3) Calculating areas which can be safely and legally parked in based on the actual road test data and calculating the first parking location in the safe and legal parking area; (4) Counting positioning data based on positions on where a large number of users to get on and off the car when call a taxi, and analyzing and processing the positioning data via big data to obtain a probability distribution of safe and legal areas where to get on and off, and then the safe and legal parking areas where to get on and off being obtained, and calculating the first parking location in the legal parking area; (5) Manually correcting automated results by marking on the high-precision map to distinguish safe and legal parking areas, and calculating the first reference locations in the legal parking area.

In some embodiments, the target location may be directly used as the first parking location.

Figure 7B:
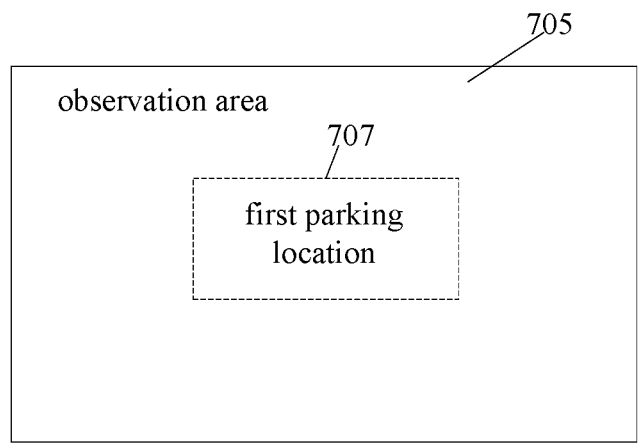
FIGS. 7B-7C are schematic diagrams of observation areas in accordance with an embodiment.

In step S203, an observation area is constructed according to the first parking location. As shown in FIG. 7B, the observation area 705 is an area located within a specified range around the first parking location 707, and the area is constructed by a perception system of the autonomous driving vehicle 100 and the cooperative vehicle infrastructure system.

Figure 7C:
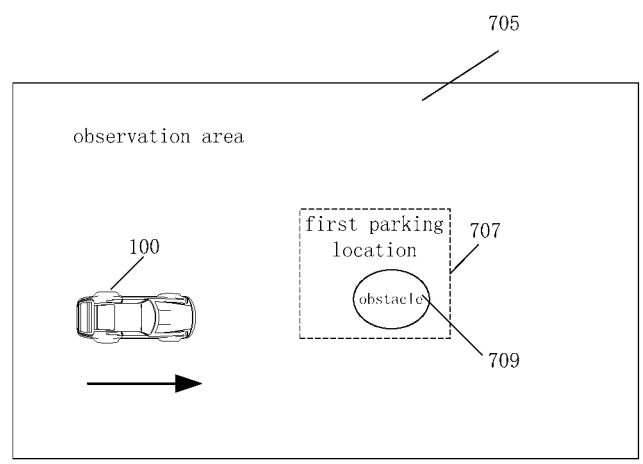

In step step S205, environmental data of the observation area is obtained when the autonomous driving vehicle reaches the observation area. As shown in FIG. 7C, when the autonomous driving vehicle 100 is approaching the first parking location 707, the autonomous driving vehicle 100 confirm whether the first parking location 707 is currently occupied according to the environmental data fed back by to the perception system and the cooperative vehicle infrastructure system of the autonomous driving vehicle 100. The first parking location 707 maybe occupied by other vehicles, temporarily repaired roads, or occupied by other obstacles 709 and so on.

In step S207, It is determined that whether the first parking location is available or not according to the environmental data of the observation area. The autonomous driving vehicle 100 determines that the first parking location 707 is occupied by other vehicles, temporarily repaired or occupied by other obstacles, etc. according to the information fed back from the perception system and the cooperative vehicle infrastructure system of the autonomous driving vehicle and when the first parking location 707 is determined to be occupied, the first parking location 707 is determined to not meet parking conditions. As shown in FIG. 7C, there is an obstacle 709 on the first parking location 707, and the obstacle 709 occupies most of the available parking space of the first parking location 707. When driving to the first parking location 707 and the autonomous driving vehicle 100 will detect that there is an obstacle 709 in the first parking location 707, the sensing system of the autonomous driving vehicle 100 acquires the data of the obstacle 709 in the first parking location 707, and determines the first parking location 707 to be unavailable according to the acquired data of the obstacle 709.

When the autonomous driving vehicle 100 determines that the first parking location 707 is not occupied by other vehicles, temporarily repaired roads, or occupied by other obstacles based on the environmental data fed back by the perception system and the cooperative vehicle infrastructure system of the autonomous driving vehicle. It is determined that the parking location 707 satisfies the parking conditions when the first parking location 707 is not occupied by other vehicles, temporarily repaired roads, or occupied by other obstacles.

In step S209, the autonomous driving vehicle drives to the first parking location to park when the first parking location is available. In detail, the autonomous vehicle 100 is parked in the first parking location according to a predetermined parking rule. In this embodiment, the predetermined parking rule adopts different parking modes according to a certain terrain, which will be described in detail below.

In step S211, when the first parking location is unavailable, a second parking location is acquired according to the predetermined evaluation rule, and the second parking location is recommended to the user for selection. In detail, when the first parking location is determined to be not available according to the environmental data of the observation area, second reference locations are acquired according to the predetermined evaluation rule, and the predetermined evaluation rule of the second reference location is set based on the parking location with the highest priority of the first parking location algorithms. For example, the parking location algorithm of a certain scene is the algorithm illustrated in step S201, the priority is arranged that a priority of the algorithm (1) is level one, the highest priority; a priority of the algorithm (2) is the level two; a priority of the algorithm (3) is level three; a priority of the algorithm (4) is level four; and a priority of the algorithm (4) is level five, and the second reference locations are obtained according to the algorithm (1), and the second parking location is selected from the second reference locations.

In step S213, the autonomous driving vehicle 100 drives to the second parking location selected by the user to park. In detail, the autonomous driving vehicle 100 is parked at the second parking location according to a predetermined parking rule. In this embodiment, the predetermined parking rule adopts different methods according to a certain terrain, which will be described in detail below.

Figure 3:
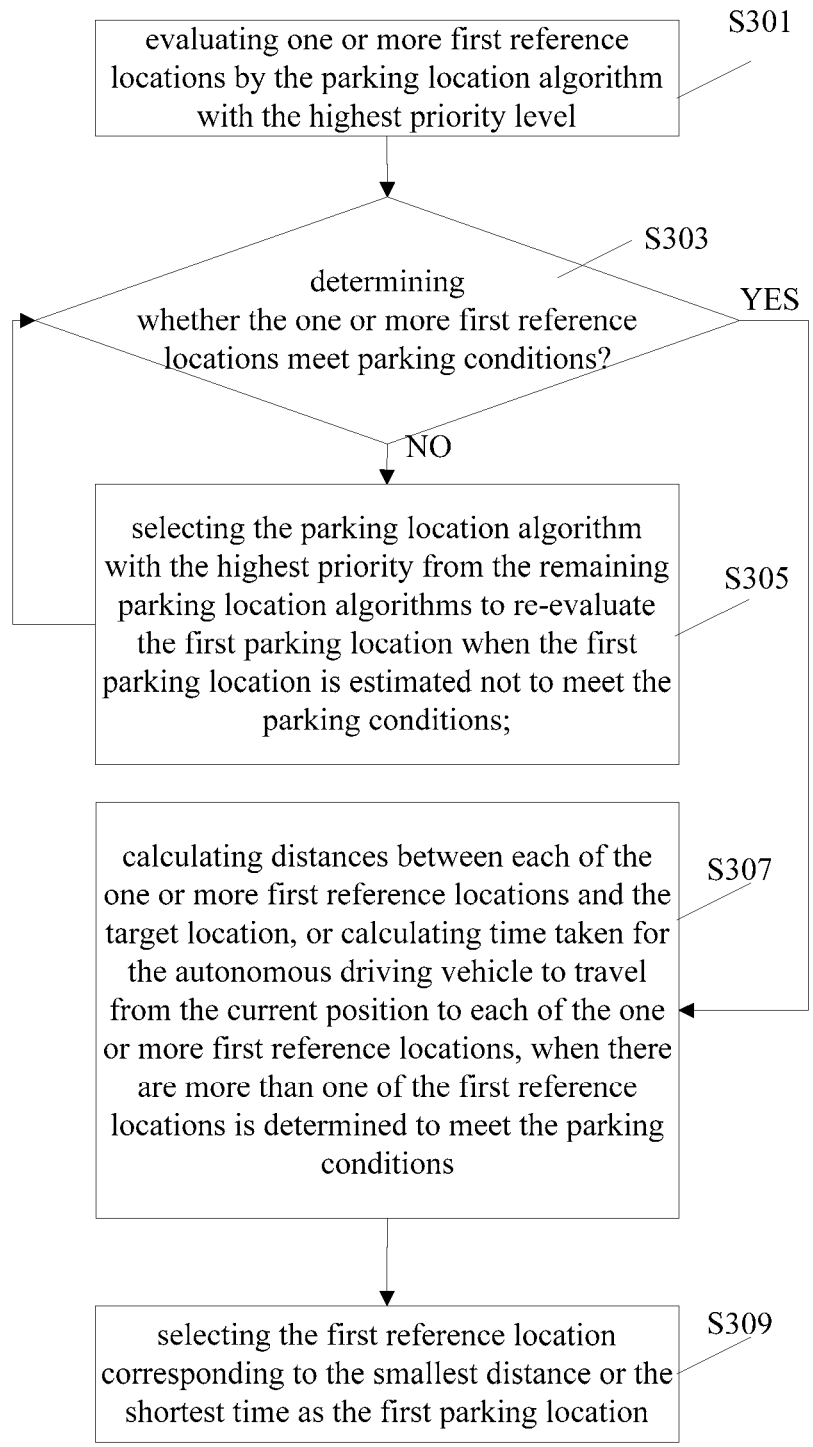
FIG. 3 is a schematic diagram of a process of obtaining a first parking position in accordance with an embodiment.

Referring to FIG. 3, which is a schematic diagram of obtaining a first parking location according to an embodiment. The step 201a first parking location is obtained according to an acquired target location including the following steps.

In step S301, one or more first reference locations are evaluated according to the parking location algorithm of the highest priority level. In detail, as shown in FIG. 7A, when the parking scene 701 is an office building scene, the parking location algorithm (4) can be used as the algorithm of the highest priority to evaluate the first parking location. When the parking scene 701 is a non-arterial road scene with less pedestrian and traffic volume, the parking location algorithm (1) can be used as the algorithm of the highest priority to evaluate the first parking location.

In step S303, it is determined that whether the first reference location meets the parking conditions or not. The parking conditions include but are not limited to, whether there is temporary road repair, and whether the distance from the target location is too large.

In step S305, the parking location algorithm with the highest priority is selected from the remaining parking location algorithms to re-evaluate the first parking location when it is determined that the first parking location does not meet the parking conditions. In detail, the user specifies the target location, and the first reference location is calculated according to the remaining algorithms without the algorithm with the highest priority when the first reference location recommended via the parking location algorithm with the highest level does not meet the parking conditions, such as the first reference location encounters temporary road repairs or exists obstacles and so on.

In step S307, distances between each first reference location and the target location, or the time taken for the autonomous driving vehicle to travel from the current position to each first reference positions are calculated when a plurality of the first-reference positions meet the parking conditions. In detail, the distance between the first to-be-parked location and the target location is calculated according to coordinate information of the first reference location and coordinate information of the target location provided by the high-precision map. Or the time taken for the autonomous driving vehicle 100 to travel from the current location to each first reference location based on the average speed of the autonomous driving vehicle 100 and distance between the first reference location and the target location obtained from the high-precision map.

In step S309, the first reference location corresponding to the smallest distance or the shortest time spent is selected as the first parking location. For example, in the case of the distance between the first parking location and the target location being zero, the target location is the first parking location.

Figure 4:
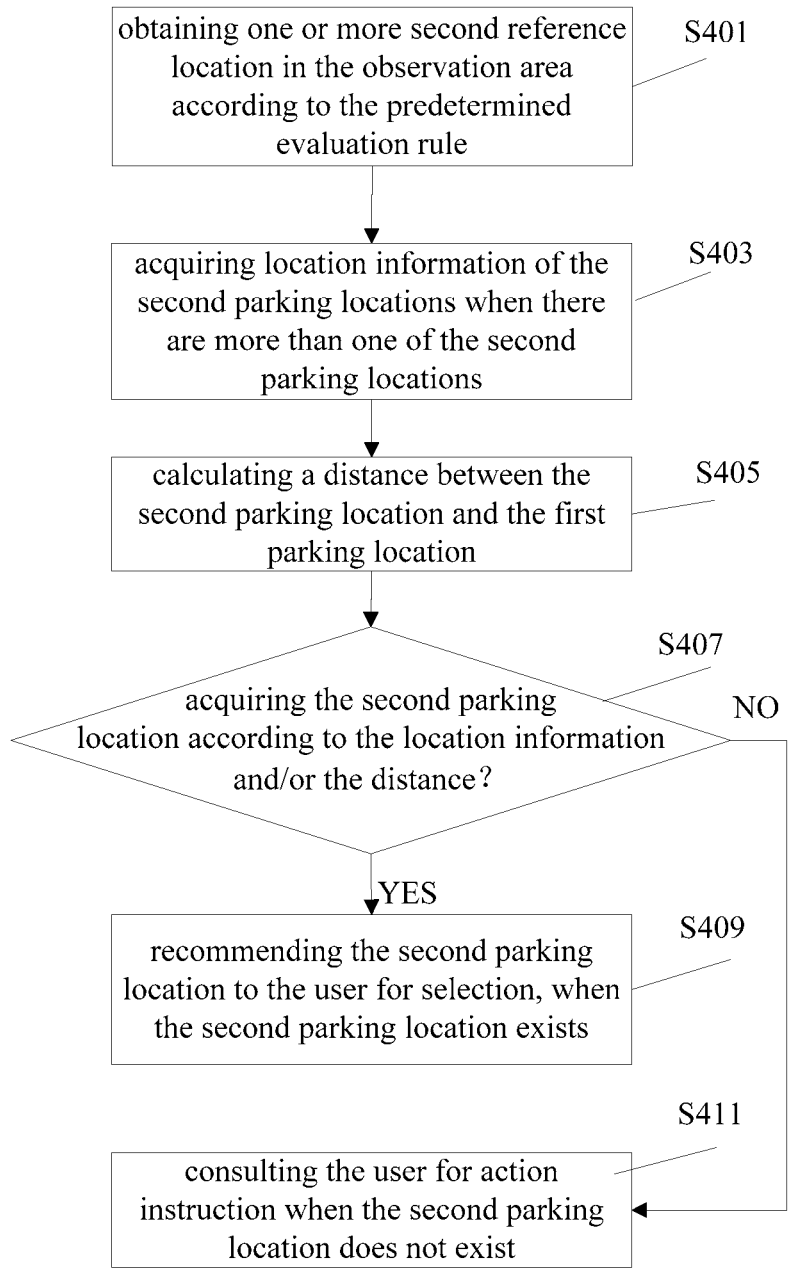
FIG. 4 is a schematic diagram of a process of obtaining a second parking position in accordance with an embodiment.

Referring to FIG. 4, it illustrates a flowchart diagram of obtaining a second parking location according to an embodiment. When the first parking location is unavailable, obtaining the second parking location according to the predetermined evaluation rule, and recommending the second parking location to the user for selection includes the following steps.

In step S401, one or more second reference locations in the observation area are acquired according to a predetermined evaluation rule. In detail, when the distance between the second parking location and the first parking location is within a predetermined range (for example, 300 meters), the predetermined evaluation rule for the second parking location is set based on the parking location algorithm with the highest priority of the first parking location. For example, the target location specified by the user near an office building, and the corresponding scene is an office building scene, and the algorithm (4) described in step S301 is set as the highest priority algorithm. In the case that the first parking location is not available, the algorithm (4) described in step S301 is used to obtain the second reference location available in the observation area.

In step S403, the location information of the second reference locations is obtained when there are more than one of the second reference locations. In detail, a high-precision map can be used to obtain the location information of the second reference locations and the first parking location on the high-precision map.

In step S405, the distance between the second reference location and the first parking location is calculated. In detail, the location information provided by the high-precision map is used to calculate the distance between the second to be-parked location and the first parking location.

In step S407, a second parking location is to be acquired according to the location information and/or distance. In detail, it is determined that whether there is a second reference location in the predetermined direction or not according to the location information. When there are more than one of the reference locations, the reference location with the smallest distance is selected as the second parking location, the detail content could refer to the content described in step S501-step S505, which will not be repeated here.

In step S409, the second parking location is recommended to the user for selection when the second parking location exists. In detail, when there are plurality of the second parking locations that meet the conditions, one of the second parking locations will be selected by the user. When there is one second parking location, the one second parking location is also recommended to the user and the user confirms whether the second parking location is selected to park in or not.

In step S411, consulting the user for action instruction when the second parking location does not exist. In detail, when the autonomous driving vehicle 100 senses that most of the available area of the first parking location is occupied by obstacles, and an available second parking location does not exist, it will ask the user that whether the target location is changed or not.

When autonomous driving vehicle senses that most of the available area of the first parking location is occupied by obstacles, and autonomous driving vehicle does not find an available second parking location, it can also drive in the observation range according to the user's instruction to find the second parking. The location and search method are similar to the previous ones.

Figure 5:
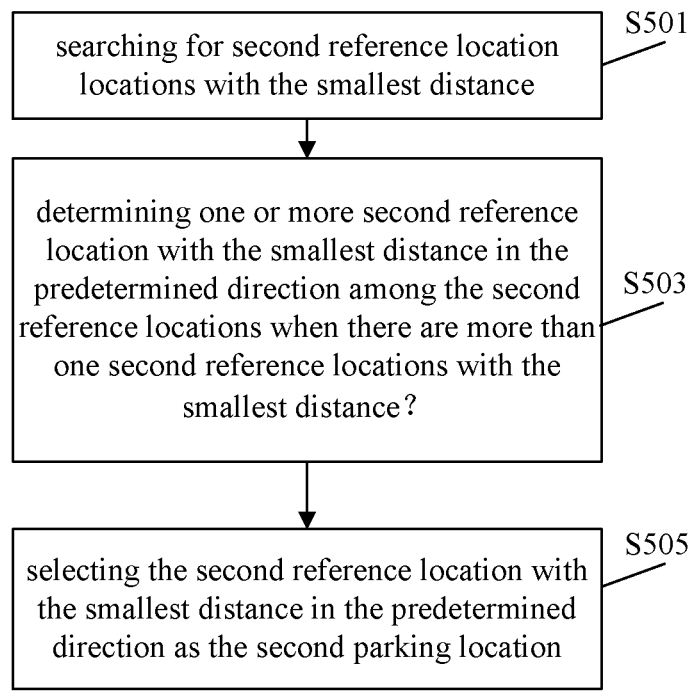
FIG. 5 is a schematic diagram of a sub-process of selecting a second parking position in accordance with an embodiment.

Referring to FIG. 5, it illustrates a schematic diagram of a sub-flowchart of selecting a second parking location according to an embodiment. Obtaining the second parking location according to the location information and/or distance includes the following steps:

In step S501, the second reference location with the smallest distance is searched for. In detail, the location information of the high-precision map is used to query the coordinates of the first parking location and the second parking location. And the second parking location with the smallest distance from the first parking location is calculated through the coordinates.

In step S503, a second reference location in predetermined directions among the second reference locations with the smallest distance is determined, when there are more than one of second reference locations with the smallest distance, In detail, the autonomous driving vehicle 100 can reach the second parking location in a shorter time by driving along certain directions, and the autonomous driving vehicle 100 may take longer to reach the second parking location by driving along directions different from the certain directions.

In step S505, the second parking location with the smallest distance and located in the predetermined direction is selected as the second parking location. In detail, the predetermined direction is the driving direction of the autonomous driving vehicle 100. The autonomous driving vehicle 100 will take shortest time to reach the second parking location in the driving direction of the autonomous driving vehicle 100 because it does not need to perform operations such as steering, And the second parking location in the predetermined direction with the smallest distance is selected as the second parking location.

Figure 6:
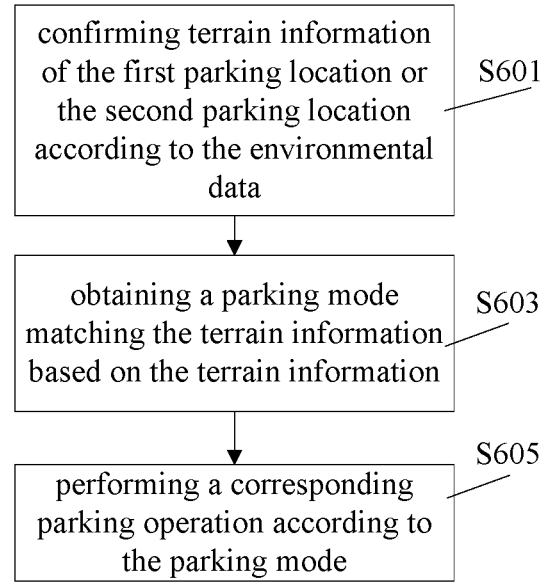
FIG. 6 is a schematic diagram of a flow chart of executing a parking space operation in accordance with an embodiment.

Referring to FIG. 6, it illustrated a flowchart of executing a parking space operation according to an embodiment. Furthermore, Driving to the first parking location or the second parking location for parking includes the following steps.

In step S601, topographical information of the first parking location or the second parking location is confirmed according to the environmental data. The environmental data can be obtained through the perception system of the autonomous driving vehicle. For example, the terrain information of the business district scene includes, but is not limited to, sizes of parking spaces drawn in the parking lot, the distribution location of the parking space drawn in the parking lot. And the terrain of the roadside scene includes but not limited to, sizes of parking spaces and the location of parking spaces.

In step S603, a parking mode matching the terrain information according to the terrain information is acquired. Different parking methods for a certain terrain includes but not limited to that the automatic driving vehicle 100 parks by reversing into the garage when the parking terrain is a garage or parking space; the driving vehicle parks by parking sideways when the parking terrain is a roadside parking space; the autonomous driving vehicle can drive to the open area and stop directly in a barrier-free area when the parking terrain is an open space where parking is legal and there is no planned parking space.

In step S605, the autonomous driving vehicle 100 is controlled to perform a corresponding parking operation according to the parking mode.

Figure 7D:
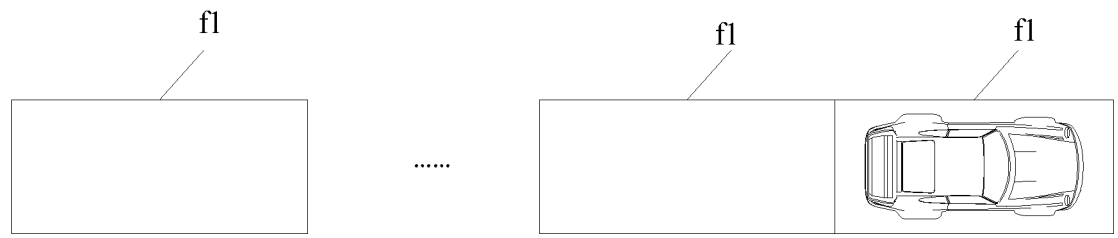
FIGS. 7D-7E are schematic diagrams of temporary parking areas in accordance with an embodiment.
Figure 7E:
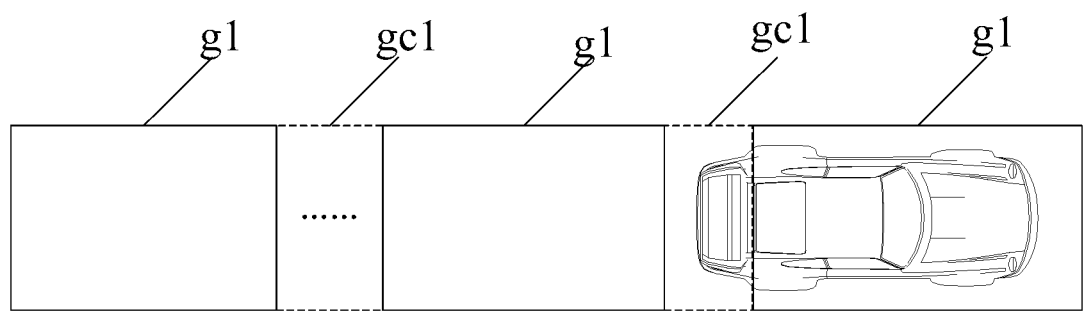

The first parking location or the second parking location includes a temporary parking area. The temporary parking area includes a plurality of consecutive and independent parking spaces, or the temporary parking area includes a plurality of parking spaces arranged in the same direction and two adjacent parking spaces and the parking spaces partially overlap. The first parking location and the second parking location may be already set parking spaces or temporary parking areas. The temporary parking area can provide one parking space or a plurality of parking spaces, and can park one or more vehicles. For example, when the temporary parking area provides a plurality of the parking spaces, the temporary parking area may include consecutive and independent N parking spaces f1 of the same size for parking N vehicles, as shown in FIG. 7D. For another example, the temporary parking area also includes N parking spaces g1 arranged along one direction, but the two adjacent parking spaces partially overlap gc1, that is, the area only provides one vehicle parking or parking for less than N vehicles, as shown in FIG. 7E. In some cases, when autonomous driving vehicle drives to the temporary parking area, and a part of the temporary parking area is blocked by obstacles, autonomous driving vehicle 100 can bypass the obstacle and park in an unoccupied parking space in the temporary parking area, so as to enable the autonomous driving vehicle 100 to park in the target location specified by the user and it is more flexible and can avoid temporary obstacles affecting the parking of autonomous driving vehicles due to only a parking location with a fixed parking space being provided.

The intelligent parking method for an autonomous driving vehicle obtains a target location from a user terminal, and the autonomous driving vehicle plans a driving route according to the information provided by a high-precision map, a cooperative vehicle infrastructure system, and the perception system to find a location specified by the user. And it solve the problem that passengers or goods of the autonomous driving vehicles can only get on and off at fixed stations, and the passengers or goods of the autonomous driving vehicles can get on and off at locations specified by the user, and optimize the practical application of the autonomous driving vehicles, and the user's ride experience becomes better.

Figure 8:
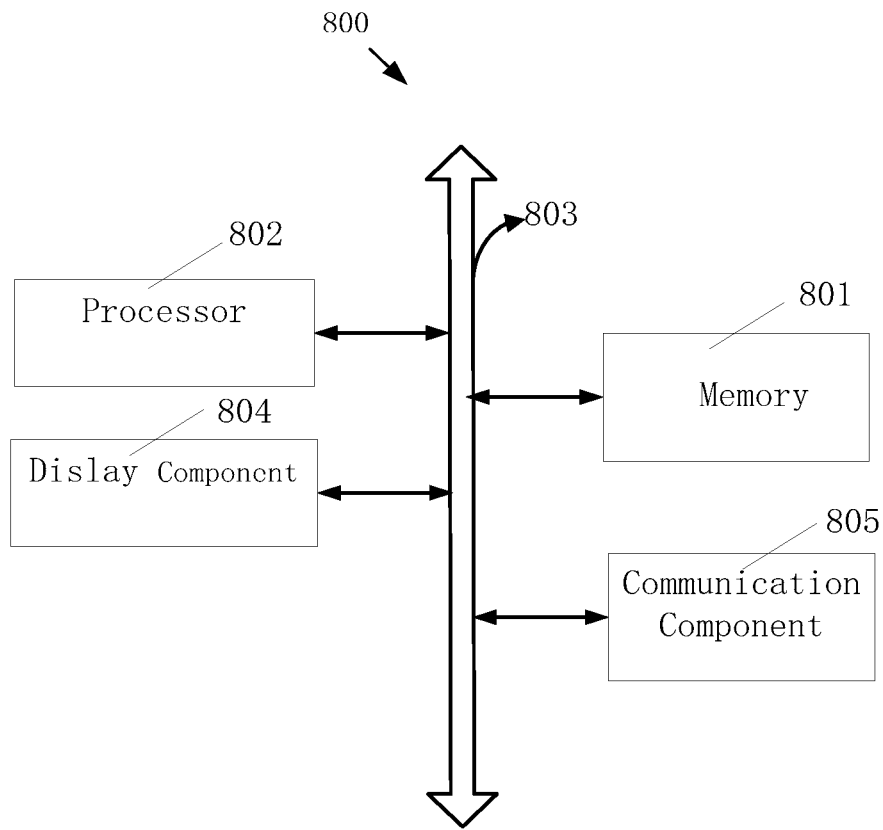
FIG. 8 is a block diagram of structure of an intelligent control device in accordance with an embodiment.

Referring to FIG. 8, it illustrates a schematic diagram of inner structure of the intelligent control device provided by the first embodiment. The intelligent control device 800 includes a memory 801, a processor 802, and a bus 803.

The memory 801 includes at least one type of readable storage medium, and the readable storage medium includes flash memory, hard disk, multimedia card, card-type memory (for example, SD or DX memory, etc.), magnetic memory, magnetic disk, optical disk, and the like. The memory 801 may be an internal storage unit of the intelligent control device 800 in some embodiments, such as a hard disk of the intelligent control device 800. In other embodiments, the memory 801 may also be a storage device of the external smart control device 800, such as a plug-in hard disk equipped on the smart control device 800, a smart memory card (Smart Media Card, SMC), and a secure digital (Secure Digital, SD) card, flash card (Flash Card), etc. Further, the memory 801 may also include both an internal storage unit of the intelligent control device 800 and an external storage device. The memory 801 can be used not only to store application software and various data installed in the intelligent control device 800, but also to temporarily store data that has been output or will be output.

The bus 803 may be a peripheral component interconnect (PCI) bus or an extended industry standard architecture (EISA) bus or the like. The bus can be divided into address bus, data bus, control bus and so on. For ease of representation, only one thick line is used in FIG. 8, but it does not mean that there is only one bus or one type of bus.

Further, the intelligent control device 800 may also include a display component 804. The display component 804 may be an LED (Light Emitting Diode, light emitting diode) display, a liquid crystal display, a touch liquid crystal display, an OLED (Organic Light-Emitting Diode, organic light emitting diode) touch device, and the like. Wherein, the display component 804 may also be appropriately referred to as a display device or a display unit, which is used to display the information processed in the intelligent control device 800 and to display a visualized user interface.

Further, the intelligent control device 800 may also include a communication component 805. The communication component 805 may optionally include a wired communication component and/or a wireless communication component (such as a WI-FI communication component, a Bluetooth communication component, etc.). A communication connection is established between the control device 800 and other computer devices.

The processor 802 may be a central processing unit (Central Processing Unit, CPU), controller, microcontroller, microprocessor or other data processing chip in some embodiments, and is used to run the program code stored in the memory 801 or Data processing. In detail, the processor 802 controls the intelligent control device 800 to implement an intelligent parking method for an autonomous driving vehicle.

FIG. 8 only shows the intelligent control device 800 with components 801-805 and the intelligent parking method for automatic driving vehicles. Those skilled in the art can understand that the structure shown in FIG. 8 does not constitute a limitation on the intelligent control device 800 It may include fewer or more components than shown, or a combination of some components, or a different component arrangement.

In the above-mentioned embodiment, it can be realized by an intelligent control device. When it is implemented using an intelligent control device, it can be implemented in whole or in part in the form of an intelligent control device program product.

The intelligent parking method of the autonomous driving vehicle includes one or more computer instructions. When the method is loaded and executed on the intelligent control device, the process or function according to the embodiment is generated in whole or in part. The method can be stored in a computer-readable storage medium, or transmitted from one intelligent control device-readable storage medium to another intelligent control device-readable storage medium, and the intelligent control device-readable storage medium can be stored by the intelligent control device Any available medium or a data storage device such as a server or data center integrated with one or more available media. The usable medium may be a magnetic medium (for example, a floppy disk, a hard disk, and a magnetic tape), an optical medium (for example, a DVD), or a semiconductor medium (for example, a solid state disk (SSD)).

Those skilled in the art can clearly understand that, for the convenience and conciseness of the description, the specific working process of the above-described system, device, and unit can refer to the corresponding process in the foregoing method embodiment, which will not be repeated here.

In the several embodiments provided in this application, it should be understood that the disclosed system, device, and method may be implemented in other ways. For example, the device embodiment described above is only illustrative. For example, the division of the unit is only a logical function division. In actual implementation, there may be other division methods. For example, multiple units or components may be combined or may be Integrate into another system, or some features can be ignored or not implemented. In addition, the displayed or discussed mutual coupling or direct coupling or communication connection may be indirect coupling or communication connection through some interfaces, devices or units, and may be in electrical, mechanical or other forms.

The unit described as a separate component may or may not be physically separated, and the component displayed as a unit may or may not be a physical unit, that is, it may be located in one place, or may be distributed on multiple network units. Some or all of the units may be selected according to actual needs to achieve the objectives of the solutions of the embodiments.

In addition, the functional units in the various embodiments of the present application may be integrated into one processing unit, or each unit may exist alone physically, or two or more units may be integrated into one unit. The above-mentioned integrated unit can be implemented in the form of hardware or software functional unit.

If the integrated unit is implemented in the form of a software functional unit and sold or used as an independent product, it can be stored in an intelligent control device readable storage medium. Based on this understanding, the technical solution of the present application essentially or the part that contributes to the existing technology or all or part of the technical solution can be embodied in the form of a software product. The method is stored in a storage medium, including Several instructions are used to make an intelligent control device (which may be a personal computer, a server, or a network device, etc.) execute all or part of the steps of the methods in the various embodiments of the present application. The aforementioned storage media include: U disk, mobile hard disk, read-only memory (ROM, Read-Only Memory), random access memory (RAM, Random Access Memory), magnetic disks or optical disks and other media that can store program codes.

It should be noted that the serial numbers of the above-mentioned embodiments are only for description, and do not represent the superiority or inferiority of the embodiments. And the terms "include", "include" or any other variants thereof in this article are intended to cover non-exclusive inclusion, so that a process, device, article or method including a series of elements not only includes those elements, but also includes The other elements listed may also include elements inherent to the process, device, article, or method. If there are no more restrictions, the element defined by the sentence "including a . . . " does not exclude the existence of other identical elements in the process, device, article, or method that includes the element.

The above are only preferred embodiments and do not limit the scope. Any equivalent structure or equivalent process transformation made by using the content of the description and drawings, or directly or indirectly applied to other related technical fields, The same reason is included in the scope of patent protection.

The invention claimed is:

1. An intelligent parking method of an autonomous driving vehicle, the intelligent parking method comprising:
   recommending a first parking location according to an acquired target location;
   constructing an observation area according to the first parking location;

obtaining environmental data of the observation area when the autonomous driving vehicle reaches the observation area;

determining whether the first parking location is available or not according to the environmental data of the observation area;

driving to the first parking location to park when the first parking location is available; or acquiring a second parking location according to a predetermined evaluation rule when the first parking location is unavailable, and recommending the one or more second parking locations to the user for selection; and driving to the second parking location selected by the user to park, wherein acquiring the second parking location according to a predetermined evaluation rule when the first parking location is unavailable comprises:

obtaining one or more second reference locations in the observation area according to the predetermined evaluation rule;

acquiring location information of the second parking locations when there are more than one of the second parking locations;

calculating a distance between the second parking location and the first parking location;

acquiring the second parking location according to the location information and/or the distance;

recommending the second parking location to the user for selection, when the second parking location exists; and consulting the user for action instruction when the second parking location does not exist.

2. The intelligent parking method of claim 1, wherein recommending the first parking location according to the acquired target location comprises:

matching a parking scene of the target location according to the acquired target location; and recommending the first parking location according to the parking scene.

3. The intelligent parking method of claim 2, wherein recommending a first parking location according to the parking scene comprising:

providing a plurality of parking location algorithm arranged in a priority order of the parking scenes, and priority levels of the parking location algorithms with different scenes are different;

selecting a parking location algorithm with a highest priority level based on the parking scene, and recommending the first parking location.

4. The intelligent parking method of claim 3, wherein selecting a parking location algorithm with a highest priority level based on the parking scene, and recommending the first parking location comprises:

evaluating one or more first reference locations by the parking location algorithm with the highest priority level;

determining whether the one or more first reference locations meet parking conditions;

selecting the parking location algorithm with the highest priority from the remaining parking location algorithms to re-evaluate the first parking location when the first parking location is estimated not to meet the parking conditions; or calculating distances between each of the one or more first reference locations and the target location, Or calculating time taken for the autonomous driving vehicle to travel from the current position to each of the one or more first reference locations, when there are more than one of the first reference locations is determined to meet the parking conditions; and selecting the first reference location corresponding to the smallest distance or the shortest time as the first parking location.

5. The intelligent parking method of claim 1, wherein acquiring the second parking location according to the location information and/or the distance comprises:

determining whether there are one or more second reference location in a predetermined direction or not according to the location information;

selecting the second reference location with the smallest distance as the second parking location when there are more than one of the second parking locations in the predetermined direction; or wherein acquiring the second parking location according to the location information and/or the distance comprises:

searching for second reference location locations with the smallest distance;

determining whether there is one or more second reference location with the smallest distance in the predetermined direction among the second reference locations when there are more than one second reference locations with the smallest distance; and selecting the second reference location with the smallest distance in the predetermined direction as the second parking location.

6. The intelligent parking method of claim 1, wherein consulting the user for action instruction when the second parking location does not exist comprises:

determining whether to continue to search for the second reference location in the observation area according to the user's instructions; or determining whether to reacquire the target location according to the user's instructions.

7. The intelligent parking method of claim 1, wherein the first parking location or the second parking location comprises a temporary parking area, the temporary parking area comprises a plurality of consecutive and independent multiple parking spaces, or the temporary parking area comprises a plurality of parking spaces arranged along the same direction, and two adjacent parking spaces partially overlap.

8. The intelligent parking method of claim 1, wherein driving to the first parking location or the second parking location to park comprises:

confirming terrain information of the first parking location or the second parking location according to the environmental data;

obtaining a parking mode matching the terrain information based on the terrain information;

performing a corresponding parking operation according to the parking mode.

9. An intelligent control device for an automatic driving vehicle, the intelligent control device comprising:

a memory for storing program instructions; and one or more processor, configured to execute the program instructions to enable the intelligent control device to implement an intelligent parking method, the intelligent parking method comprising:

recommending a first parking location according to an acquired target location;

constructing an observation area according to the first parking location;

obtaining environmental data of the observation area when the autonomous driving vehicle reaches the observation area;

determining whether the first parking location is available or not according to the environmental data of the observation area;
driving to the first parking location to park when the first parking location is available; or
acquiring a second parking location according to a predetermined evaluation rule when the first parking location is unavailable, and recommending the one or more second parking locations to the user for selection; and
driving to the second parking location selected by the user to park,
wherein acquiring the second parking location according to a predetermined evaluation rule when the first parking location is unavailable comprises:
obtaining one or more second reference location in the observation area according to the predetermined evaluation rule;
acquiring location information of the second parking locations when there are a plurality of the second parking locations;
calculating a distance between the second parking location and the first parking location;
acquiring the second parking location according to the location information and/or the distance;
recommending the second parking location to the user for selection, when the second parking location exists; and
consulting the user for action instruction when the second parking location does not exist.

10. The intelligent control device of claim 9, wherein recommending the first parking location according to the acquired target location comprises:
matching a parking scene of the target location according to the acquired target location; and
recommending the first parking location according to the parking scene.

11. The intelligent control device of claim 10, wherein recommending a first parking location according to the parking scene comprises:
providing a plurality of parking location algorithm arranged in a priority order of the parking scenes, and priority levels of the parking location algorithms with different scenes are different;
selecting a parking location algorithm with a highest priority level based on the parking scene, and recommending the first parking location.

12. The intelligent control device of claim 11, wherein selecting a parking location algorithm with a highest priority level based on the parking scene, and recommending the first parking location comprises:
evaluating one or more first reference locations by the parking location algorithm with the highest priority level;
determining whether the one or more first reference locations meet parking conditions;
selecting the parking location algorithm with the highest priority from the remaining parking location algorithms to re-evaluate the first parking location when the first parking location is estimated not to meet the parking conditions; or
calculating distances between each of the one or more first reference locations and the target location, or calculating time taken for the autonomous driving vehicle to travel from the current position to each of the one or more first reference locations, when there are more than one of the first reference locations is determined to meet the parking conditions; and
selecting the first reference location corresponding to the smallest distance or the shortest time as the first parking location.

13. The intelligent control device of claim 9, wherein acquiring the second parking location according to the location information and/or the distance comprises:
determining whether there are one or more second reference location in a predetermined direction or not according to the location information;
selecting the second reference location with the smallest distance as the second parking location when there are more than one of the second parking locations in the predetermined direction; or
wherein acquiring the second parking location according to the location information and/or the distance comprising:
searching for second reference location locations with the smallest distance;
determining whether there is one or more second reference location with the smallest distance in the predetermined direction among the second reference locations when there are more than one second reference locations with the smallest distance; and
selecting the second reference location with the smallest distance and located in the predetermined direction as the second parking location.

14. The intelligent control device of claim 13, wherein consulting the user for action instruction when the second parking location does not exist comprises:
determining whether to continue to search for the second reference location in the observation area according to the user's instructions; or
determining whether to reacquire the target location according to the user's instructions.

15. The intelligent control device of claim 9, wherein the first parking location or the second parking location comprises a temporary parking area, the temporary parking area comprises a plurality of consecutive and independent multiple parking spaces, or the temporary parking area comprises a plurality of parking spaces arranged along the same direction, and two adjacent parking spaces partially overlap.

16. The intelligent control device of claim 9, wherein driving to the first parking location or the second parking location to park comprises:
confirming terrain information of the first parking location or the second parking location according to the environmental data;
obtaining a parking mode matching the terrain information based on the terrain information;
performing a corresponding parking operation according to the parking mode.

17. An autonomous driving vehicle, the autonomous driving vehicle comprising:
a main body; and
an intelligent control device installed in the main body, the intelligent control device comprising:
a memory for storing program instructions; and
one or more processor, configured to execute the program instructions to enable the intelligent control device to implement an intelligent parking method, the intelligent parking method comprising:
recommending a first parking location according to an acquired target location;
constructing an observation area according to the first parking location;

obtaining environmental data of the observation area when the autonomous driving vehicle reaches the observation area;

determining whether the first parking location is available or not according to the environmental data of the observation area;

driving to the first parking location to park when the first parking location is available; or acquiring a second parking location according to a predetermined evaluation rule when the first parking location is unavailable, and recommending the one or more second parking locations to the user for selection; and driving to the second parking location selected by the user to park, wherein acquiring the second parking location according to the location information and/or the distance comprises:

determining whether there are one or more second reference location in a predetermined direction or not according to the location information;

selecting the second reference location with the smallest distance as the second parking location when there are more than one of the second parking locations in the predetermined direction; or wherein obtaining the second parking location according to the location information and/or the distance comprises:

searching for second reference location locations with the smallest distance;

determining whether there is one or more second reference location with the smallest distance in the predetermined direction among the second reference locations when there are more than one second reference locations with the smallest distance; and selecting the reference location with the smallest distance and located in the predetermined direction as the second parking location.

* * * * *